Patented June 18, 1929.

1,718,093

UNITED STATES PATENT OFFICE.

GERARD CAREL ADRIAAN VAN DORP, OF KATWIJK A/ZEE, NETHERLANDS, ASSIGNOR TO NAAMLOOZE VENNOOTSCHAP: SOCIETEIT VOOR CHEMISCHE INDUSTRIE "KATWIJK," OF KATWIJK A/ZEE, NETHERLANDS.

PROCESS FOR EXTRACTING THEOBROMINE FROM NATURAL PRODUCTS.

No Drawing. Application filed March 15, 1928, Serial No. 262,055, and in the Netherlands March 22, 1927.

My invention relates to a process for extracting theobromine from natural products. This process consists in intimately mixing the ground theobromine-containing material with an earth alkali metal hydroxide, preferably magnesium or calcium hydroxide, though the hydroxide of any other metal of the earth alkali metal group may be utilized in large excess with relation to the theobromine content of the material; gradually adding to the so obtained mixture, while continuously stirring and preferably gently heating such a quantity of water that the mixture apparently maintains its dry condition, and subsequently adding, while stirring, a further quantity of preferably warm water such that the total quantity of water added amounts to about four times the weight of the treated theobromine-containing material; then subjecting the obtained mixture to a filtering operation and finally treating the obtained solution of the earth alkali metal salt of the theobromine in the usual manner for precipitating a substance dissolved in an alkali, i. e., by adding a suitable acid, preferably hydrochloric acid.

It has already been proposed to extract theobromine from natural products by treating the preferably finely divided material at ordinary temperature with an excess of water and of earth alkali metal hydroxide and subsequently subjecting the obtained wet mass to a filtering operation, concentrating the filtrate by evaporation and obtaining the theobromine from the dissolved earth alkali metal salt in the above described manner.

Now it appears that, although an extraction of the theobromine at ordinary temperature wtih an excess of water and of earth alkali metal hydroxide is possible, said extraction progresses much better and more rapidly at higher temperatures. According to my invention the extraction is for this reason preferably carried out by means of warm water.

It might perhaps be possible to satisfactorily treat cocoa bean husks according to the above-mentioned known process; but when treating ground cocoa fruits, i. e., husks and beans or cocoa beans alone, then filtration generally becomes impossible on account of the filter soon becoming clogged, so that that process cannot be adopted. Also the obtained extract is very impure, and without concentration or other means to remove the impurities a pure theobromine cannot be obtained, as it can with the present process by direct precipitation with an acid.

According to my invention it is possible to extract the theobromine substantially quantitatively from all kinds of ground materials and consequently also from cocoa beans, the extract being in a very pure condition so that no purification thereof becomes necessary. For this purpose the water is added, in contradistinction to the known art, to the mixture of theobromine-containing material and finally-divided earth alkali metal hydroxide in two stages.

In the first stage, such a portion of the required quantity of water is added, while stirring, to the aforesaid mixture of theobromine-containing material and earth alkali metal hydroxide as to obtain an apparently dry mixture. In this manner it becomes possible to incorporate in the mass more than 50% of water with relation to the weight of the dry mixture.

When adding the first quantity of water the remarkable phenomenon occurs that even when adding it in cold condition the temperature of the pulverulent mixture is considerably raised, presumbaly as the result of an exothermic reaction. During this treatment large quantities of ammonia escape; but when a pulpy mass with an excess of water is prepared directly in one stage, the ammonia remains in the water and colloidally dissolves the starting material, with the result that filtration becomes difficult, if not impossible.

Therefore if circumstances permit, the said warm, apparently-dry, water-containing powder is left for a suitable time, not exceeding 24 hours, in the form of a thin layer which is however not strictly necessary: the powder may also be treated immediately with a further quantity of water.

In the second stage of the treatment with water, such a quantity thereof is added that its total quantity amounts to about four times the weight of the theobromine-containing material.

The invention will now be elucidated by the following example:

100 kg. of ground cocoa fruits are intimately mixed with a quantity of dry slaked lime obtained by slaking 30 kg. of quicklime. To this mixture are gradually added, while continuously stirring, 100 litres of water in about ten minutes to half an hour, while the powder maintains its original dry condition, though its temperature rises to about 70° C. During this treatment large quantities of ammonia are freed and escape. Subsequently, either immediately or after the powder has been left to itself for 24 hours in the form of a thin layer, a further quantity of 250 liters of warm water having a temperature of about 70° C. is added, while continuously stirring. After having been stirred for about one hour the mass is filtered and the theobromine subsequently separated in the manner indicated above from the obtained liquid containing the lime salt of theobromine in solution.

The new process possesses over the known methods not only the advantage that it may be applied to all kinds of finely divided theobromine-containing natural products, but also that the evaporation of water from the filtrate obtained from the water-treated mixture of the natural product and earth alkali metal hydroxide become superfluous.

I claim:

1. A process for extracting theobromine from natural products, consisting in intimately mixing the ground material to be treated with an earth alkali metal hydroxide in large excess with relation to the theobromine content of the material; gradually adding to the mixture, while continuously stirring, such a quantity of water that the mixture apparently maintains its dry condition, and subsequently adding, while stirring, a further quantity of water such that the total quantity added amounts to about four times the weight of the theobromine-containing material being treated; then subjecting the obtained mixture to a filtering operation; and finally treating the solution of the metal salt of the theobromine in the manner usual in precipitating a substance dissolved in an alkali, thereby to obtain the pure theobromine.

2. A process for extracting theobromine from natural products, consisting in intimately mixing the ground material to be treated with an earth alkali metal hydroxide in large excess with relation to the theobromine content of the material; gradually adding to the mixture, while continuously stirring and gently heating, such a quantity of water that the mixture apparently maintains its dry condition, and subsequently adding, while stirring, a further quantity of water such that the total quantity added amounts to about four times the weight of the theobromine-containing material being treated; then subjecting the obtained mixture to a filtering operation; and finally treating the solution of the metal salt of the theobromine in the manner usual in precipitating a substance dissolved in an alkali, thereby to obtain the pure theobromine.

3. A process for extracting theobromine from natural products, consisting in intimately mixing the ground material to be treated with an earth alkali metal hydroxide in large excess with relation to the theobromine content of the material; gradually adding to the mixture, while continuously stirring, such a quantity of water that the mixture apparently maintains its dry condition, and subsequently adding, while stirring, a further quantity of warm water such that the total quantity added amounts to about four times the weight of the theobromine-containing material being treated; then subjecting the obtained mixture to a filtering operation; and finally treating the solution of the metal salt of the theobromine in the manner usual in precipitating a substance dissolved in an alkali, thereby to obtain the pure theobromine.

4. A process for extracting theobromine from natural products, consisting in intimately mixing the ground material to be treated with an earth alkali metal hydroxide in large excess with relation to the theobromine content of the material; gradually adding to the mixture, while continuously stirring and gently heating, such a quantity of water that the mixture apparently maintains its dry condition, and subsequently adding, while stirring, a further quantity of warm water such that the total quantity added amounts to about four times the weight of the theobromine-containing material being treated; then subjecting the obtained mixture to a filtering operation; and finally treating the solution of the metal salt of the theobromine in the manner usual in precipitating a substance dissolved in an alkali, thereby to obtain the pure theobromine.

5. A process for extracting theobromine from natural products, consisting in intimately mixing the ground material to be treated with an earth alkali metal hydroxide in large excess with relation to the theobromine content of the material; gradually adding to the mixture, while continuously stirring, such a quantity of water that the mixture apparently maintains its dry condition allowing the mixture to stand in a thin layer for a period of time not exceeding 24 hours, and subsequently adding, while stirring, a further quantity of water such that the total quantity added amounts to about four times the weight of the theobromine-containing material being treated; then subjecting the obtained mixture to a filtering operation; and finally treating the solution of the metal salt of the theobromine in the manner usual in precipitating a substance dissolved in an alkali, thereby to obtain the pure theobromine.

6. A process for extracting theobromine from natural products, consisting in intimately mixing the ground material to be treated with an earth alkali metal hydroxide in large excess with relation to the theobromine content of the material; gradually adding to the mixture, while continuously stirring and gently heating, such a quantity of water that the mixture apparently maintains its dry condition allowing the mixture to stand in a thin layer for a period of time not exceeding 24 hours, and subsequently adding, while stirring, a further quantity of water such that the total quantity added amounts to about four times the weight of the theobromine-containing material being treated; then subjecting the obtained mixture to a filtering operation; and finally treating the solution of the metal salt of the theobromine in the manner usual in precipitating a substance dissolved in an alkali, thereby to obtain the pure theobromine.

7. A process for extracting theobromine from natural products, consisting in intimately mixing the ground material to be treated with an earth alkali metal hydroxide in large excess with relation to the theobromine content of the material; gradually adding to the mixture, while continuously stirring, such a quantity of water that the mixture apparently maintains its dry condition allowing the mixture to stand in a thin layer for a period of time not exceeding 24 hours, and subsequently adding, while stirring, a further quantity of warm water such that the total quantity added amounts to about four times the weight of the theobromine-containing material being treated; then subjecting the obtained mixture to a filtering operation; and finally treating the solution of the metal salt of the theobromine in the manner usual in precipitating a substance dissolved in an alkali, thereby to obtain the pure theobromine.

8. A process for extracting theobromine from natural products, consisting in intimately mixing the ground material to be treated with an earth alkali metal hydroxide in large excess with relation to the theobromine content of the material; gradually adding to the mixture, while continuously stirring and gently heating, such a quantity of water that the mixture apparently maintains its dry condition allowing the mixture to stand in a thin layer for a period of time not exceeding 24 hours, and subsequently adding, while stirring, a further quantity of warm water such that the total quantity added amounts to about four times the weight of the theobromine-containing material being treated; then subjecting the obtained mixture to a filtering operation; and finally treating the solution of the metal salt of the theobromine in the manner usual in precipitating a substance dissolved in an alkali, thereby to obtain the pure theobromine.

In testimony whereof I affix my signature.

Dr. GERARD CAREL ADRIAAN van DORP.